US009493275B2

(12) United States Patent
Adam et al.

(10) Patent No.: US 9,493,275 B2
(45) Date of Patent: Nov. 15, 2016

(54) RESEALABLE CONTAINERS AND METHODS FOR THEIR PREPARATION AND USE

(71) Applicant: EMPIRE TECHNOLOGY DEVELOPMENT LLC, Wilmington, DE (US)

(72) Inventors: Georgius Abidal Adam, Edensor Park (AU); Scott Andrew Needham, Mangerton (AU)

(73) Assignee: Empire Technology Development LLC, Wilmington, DE (US)

( * ) Notice: Subject to any disclaimer, the term of this patent is extended or adjusted under 35 U.S.C. 154(b) by 192 days.

(21) Appl. No.: 13/876,016

(22) PCT Filed: Jan. 3, 2013

(86) PCT No.: PCT/US2013/020120
§ 371 (c)(1),
(2) Date: Mar. 26, 2013

(87) PCT Pub. No.: WO2014/107152
PCT Pub. Date: Jul. 10, 2014

(65) Prior Publication Data
US 2014/0311937 A1 Oct. 23, 2014

(51) Int. Cl.
| | |
|---|---|
| B65D 41/02 | (2006.01) |
| C09J 133/10 | (2006.01) |
| C09J 183/06 | (2006.01) |
| C09K 19/04 | (2006.01) |
| C09K 19/38 | (2006.01) |
| C09J 133/00 | (2006.01) |

(52) U.S. Cl.
CPC ............. *B65D 41/02* (2013.01); *C09J 133/00* (2013.01); *C09J 133/10* (2013.01); *C09J 183/06* (2013.01); *C09K 19/04* (2013.01); *C09K 19/38* (2013.01); *C09K 19/3852* (2013.01)

(58) Field of Classification Search
CPC .... C09J 135/00; C09J 167/00; C09J 183/04; C09J 183/06; C09J 133/00; C09J 133/10; C09K 19/38; C09K 19/3804; C09K 19/3809; C09K 19/3814; C09K 19/3833; C09K 19/3838; C09K 19/3842; C09K 19/3847; C09K 19/3852; C09K 19/3861; C09K 19/3866; C09K 19/3876; C09K 19/04; C09K 19/0403; C09K 19/408; C09K 2019/0448; C08G 77/04; B65D 41/02; C09D 183/00; C09D 183/04; C09D 183/06
USPC ................... 252/299.01, 299.1–299.7, 100; 428/34.7, 35.7, 35.8, 35.9
See application file for complete search history.

(56) References Cited

U.S. PATENT DOCUMENTS

| | | | |
|---|---|---|---|
| 3,908,828 A * | 9/1975 | Lohwasser | 206/504 |
| 4,795,794 A | 1/1989 | Winnik et al. | |
| 5,139,696 A | 8/1992 | Fréchet et al. | |
| 5,501,945 A * | 3/1996 | Kanakkanatt | 430/338 |
| 5,651,462 A * | 7/1997 | Simonsen et al. | 206/557 |
| 5,843,501 A | 12/1998 | Rubin et al. | |
| 6,268,026 B1 * | 7/2001 | Jester et al. | 428/1.6 |
| 7,044,475 B2 | 5/2006 | Imai et al. | |
| 7,105,106 B2 * | 9/2006 | Samuels | C08G 63/60 252/299.01 |
| 7,316,641 B2 | 1/2008 | Rehwinkel et al. | |
| 7,592,397 B2 | 9/2009 | Markovich et al. | |
| 8,067,068 B2 | 11/2011 | Goldfinger | |
| 2003/0232924 A1 * | 12/2003 | Cho et al. | 525/100 |
| 2006/0286356 A1 | 12/2006 | Thomas et al. | |
| 2009/0048362 A1 * | 2/2009 | Ueno et al. | 522/2 |
| 2012/0103860 A1 | 5/2012 | Masuko et al. | |

OTHER PUBLICATIONS

Saez, Isabel M; Goodby, John W. Segregated liquid crystalline dendritic supermolecules—multipedes based on pentaerythritol scaffolds, Journal of Materials Chemistry (2003), 13(11), 2727-2739.*
International Search Report and Written Opinion for PCT/US2013/020120 dated Feb. 22, 2013.
Celanese, The Power of Performance Driven Solutions™, http://www.celanese.com/ticona/ticona.aspx (Printed from Internet Mar. 8, 2013).
Ciferri, Supramolecular Polymers, Second Edition, CRC Press (Apr. 26, 2005).
Kajitani et al., Liquid crystalline amides: linear arrangement of rod-like molecules by lateral intermolecular hydrogen bonding and molecular shape effect, *Journal of Materials Chemistry* (Sep. 27, 2004), 14(23):3449-3456 (Abstract).
Kato et al., Supramolecular Chirality of Thermotropic Liquid-Crystalline Folic Acid Derivatives, *Angewandte Chemie International Edition* (Mar. 30, 2004), 43(15):1969-1972 (Abstract).
Kolle et al., Fast optochemical sensor for continuous monitoring of oxygen in breath—gas analysis, *Sensors and Actuators B: Chemical* (Jan.-Feb. 1997), 38(1-3):141-149 (Abstract).
Meredish et al., Optical and nonlinear optical characterization of molecularly doped thermotropic liquid crystalline polymers, *Macromolecules* (Sep. 1982), 15(5):1385-1389 (Abstract).

(Continued)

*Primary Examiner* — Lee Sanderson
(74) *Attorney, Agent, or Firm* — Pepper Hamilton LLP

(57) ABSTRACT

Disclosed are compositions directed to resealable containers and methods directed to making and using resealable containers. Also disclosed are methods of containing an article. The resealable containers can include a thermotropic adhesive sealing composition to aid in opening and sealing the containers.

9 Claims, No Drawings

(56) References Cited

OTHER PUBLICATIONS

O'Donovan et al., Phosphorescent oxygen-sensitive materials for biological applications, *Journal of Materials Chemistry* (May 9, 2005), 15(27-28):2946-2951 (Abstract).

Osuji et al., Temperature-Dependent Photonic Bandgap in a Self-Assembled Hydrogen-Bonded Liquid-Crystalline Diblock Copolymer, *Advanced Functional Materials* (Dec. 23, 2002), 12(11-12):753-758 (Abstract).

Papkovsky, New oxygen sensors and their application to biosensing, *Sensors and Actuators B: Chemical* (Oct. 1995), 29(1-3):213-218 (Abstract).

Rowan et al., Supramolecular Interactions in the Formation of Thermotropic Liquid Crystalline Polymers, *Structure and Bonding* (Oct. 23, 2007), 128:119-149 (Abstract).

Saez et al., Segregated liquid crystalline dendritic supermolecules—multipedes based on pentaerythritol scaffolds, *Journal of Materials Chemistry* (Sep. 24, 2003), 13(11):2727-2739 (Abstract).

Saez et al., "Janus" Supermolecular Liquid Crystals—Giant Molecules with Hemispherical Architectures, *Chemistry—A European Journal* (Sep. 19, 2003), 9(20):4869-4877 (Abstract).

The Naked Scientists, Oxygen Sensitive Dye to Detect Unsafe Food, http://www.thenakedscientists.com/HTML/news/news/530/ (Nov. 30, 2003).

Voraberger et al., Novel oxygen optrode withstanding autoclavation: technical solutions and performance, *Sensors and Actuators B: Chemical* (Apr. 15, 2001), 74(1-3):179-185 (Abstract).

Vectra® liquid crystal polymer (LCP), accessed at https://web.archive.org/web/20120508044019/http://www.ticona.com/vectrabr_e.pdf, accessed on Oct. 8, 2014 pp. 1-80.

\* cited by examiner

RESEALABLE CONTAINERS AND METHODS FOR THEIR PREPARATION AND USE

CLAIM OF PRIORITY

This application is a U.S. national stage filing under 35 U.S.C. §371 of International Application No. PCT/US2013/020120 filed Jan. 3, 2013 entitled "Resealable Containers and Methods for Their Preparations and Use", the disclosure of which is incorporated by reference in its entirety.

BACKGROUND

The ability to open and close a food container is of great importance in the food packaging industry. A package needs to be opened easily so that the food can be consumed, but often the package also needs to be resealed to preserve a food for future consumption. Traditionally, the approach of food manufacturers and packagers has been to ensure that the food is well sealed in the packaging to maximize freshness and food safety. Specifically, preventing air and moisture ingress into the food package has been a focus of the industry. This has led to the development of a vast range of jars, containers, pouches, packets, etc. that are challenging to open, and in some cases unable to be properly resealed. These types of containers constitute the bulk of food packaging products.

Current gasket and sealing materials for food containers are generally very soft and sticky sol-gel polymeric materials such as natural rubber, silicones, polyesters, polyethylenes, cellophanes, and polyvinyl alcohol (PVOH). The current thinking in the food industry focusses on a total "user experience", from before a customer considers purchasing a food product through to the purchase, consumption, and repurchase of the product. The ease with which a consumer is able to access food within a package can be a significant determinant in their decision to re-purchase the same product in the future. For example, the elderly, infirm, and children represent large consumer bases that make purchase decisions at least in part, on the basis of how easily a food product can be accessed from its packaging. There is a growing need for packaging products that not only protect the integrity and ensure the quality of the food product they contain but also maximize the user's experience with the food product as whole.

SUMMARY

Presently disclosed are resealable containers and methods directed to making and using the resealable containers.

Some embodiments are directed to a resealable container comprising a container portion, a lid portion, and a thermotropic adhesive sealing composition, wherein the thermotropic adhesive sealing composition comprises a first liquid crystal polymer.

Some embodiments are directed to a method of preparing a resealable container, the method comprising: combining a lid with a container to form a closed container wherein the container, the lid or a combination thereof comprises a thermotropic adhesive sealing composition positioned at an interface of the container and the lid; changing a temperature of the container to form a sealed container wherein the seal is formed by the thermotropic adhesive sealing composition positioned at the interface of the container and the lid.

Some embodiments are directed to a method of containing an article, the method comprising: placing the article into a resealable container; placing a lid onto the resealable container, wherein a thermotropic adhesive sealing composition is positioned at an interface of the lid and the container forming a seal; and forming a sealed container.

DETAILED DESCRIPTION

In the present disclosure, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be used, and other changes may be made, without departing from the spirit or scope of the subject matter presented herein. It will be readily understood that the aspects of the present disclosure, as generally described herein, and illustrated in the FIGURE, can be arranged, substituted, combined, separated, and designed in a wide variety of different configurations, all of which are explicitly contemplated herein.

As used herein, a "liquid crystal polymer" is intended to mean an aromatic polyester polymer. In some embodiments, liquid crystal polymers are extremely unreactive and inert. In some embodiments, liquid crystal polymers have superior gas and moisture permeability properties compared to materials currently used as adhesives and gaskets.

Disclosed herein are resealable containers and methods of making and using resealable containers. Some embodiments are directed to a resealable container comprising a container portion, a lid portion, and a thermotropic adhesive sealing composition, wherein the thermotropic adhesive sealing composition comprises a first liquid crystal polymer. In some embodiments, the thermotropic adhesive sealing composition is disposed between the container portion and the lid portion. In some embodiments, the container portion of the resealable container comprises an opening and the lid portion is configured to cover the opening, wherein the thermotropic adhesive sealing composition is disposed at an interface of the container portion and the lid portion. For example, the thermotropic adhesive can be disposed on the interface of a screw-on lid and a jar. In some embodiments, the interface of the container portion and the lid portion includes a mating interface of two or more parts of the container portion, where the container and lid portions are integral to each other and the lid portion is defined by the mating interface. For example, the thermotropic adhesive can be placed on the mating interface of two or more parts of a paper carton or storage bag.

In some embodiments, the resealable container can be used to package a food product or beverage. In some embodiments, the resealable container can be used to package a perishable product. In some embodiments, resealable container can be used to package a medication, vaccine, electronic material or other products that are sensitive to environmental conditions. In some embodiments, the resealable container can be used to protect a product from environmental conditions such as but not limited to moisture or light. In some embodiments, the resealable container can be used to protect a product from microorganisms such as but not limited to bacteria, fungi, algae, protozoa, microscopic plants, and animals.

In some embodiments, the thermotropic adhesive sealing composition will have a tailored phase transition temperature (TPh) suitable for a particular food packaging application and storage condition. In some embodiments, the TPh will be designed so that a seal is effectively turned "on" and "off" through deviations in temperature allowing for the opening and closing of the food package. Temperature variations could be affected by, for example, running the package under warm water, heat produced by friction, or placing the package in a refrigerator or microwave.

In some embodiments, the thermotropic adhesive sealing composition has a phase transition temperature of about −20° C. to 60° C. In some embodiments the thermotropic adhesive sealing composition has a phase transition temperature of about −20° C. to −10° C., −10° C. to 0° C., 0° C. to 10° C., 10° C. to 20° C., 20° C. to 30° C., 30° C. to 40° C., 40° C. to 50° C., or 50° C. to 60° C.

In some embodiments, the resealable containers described herein can incorporate features that permit the user to determine a status of the food product contained within the resealable container. In some embodiments, the resealable containers described herein further comprise a status indicator. Some embodiments further comprise a status indicator, wherein the status indicator provides a status selected from sealed, un-sealed, expired, thawed, frozen, temperature, contamination, freshness, pH, and a combination thereof. In some embodiments, the status indicator provides the user with information as to the quality and suitability of the food product contained in the resealable container for consumption by the user. In some embodiments, the status indicator provides information to the user after the user has manipulated the resealable container. For example, the status indicator can inform the user about the temperature of the food product after it has been heated in an oven. In some embodiments, the status indicator facilitates the preparation of a food product contained in the resealable container for consumption.

In some embodiments, the status indicator is linked via covalent bonding, hydrogen bonding, Van der Waals forces, or a combination thereof, to the thermotropic adhesive sealing composition.

In some embodiments, the status indicator that is linked to the thermotropic adhesive sealing composition comprises a dye, an antiseptic pigment, an oxygen responsive dye, an oxidizable functional group or a combination thereof.

In some embodiments, the status indicator that is linked to the thermotropic adhesive sealing composition is selected from methylene blue, a hydroquinone antioxidant, phenolphthalein, an antioxidant derived from humic acid, an antioxidant derived from fulvic acid, a plant derived dye, ascorbic acid, gallic acid, tannin, and a combination thereof. In some embodiments, oxidation of the oxidizable functional groups changes a color of the thermotropic adhesive sealing composition.

Some embodiments further comprise an antioxidant, a colorant, a plasticizer or a combination thereof. In some embodiments, the antioxidant, plasticizer, colorant or a combination thereof is linked via covalent bonding, hydrogen bonding, Van der Waals forces, or a combination thereof, to the thermotropic adhesive sealing composition.

In some embodiments, the antioxidant that is linked to the thermotropic adhesive sealing composition is selected from a hindered phenol, a natural polyphenol antioxidant, an antioxidant derived from fulvic acid, an antioxidant derived from humic acid, ascorbic acid, gallic acid, tannin, and a combination thereof. In some embodiments, the antioxidant is present in the thermotropic adhesive sealing composition at about 0.1 wt. % to about 0.2 wt. %.

In some embodiments, the colorant that is linked to the thermotropic adhesive sealing composition is selected from caramel coloring, annatto, chlorophyllin, cochineal, betanin, turmeric, saffron, paprika, lycopene, elderberry juice, pandan, butterfly pea, litmus, FD&C Blue No. 1, FD&C Blue No. 2, FD&C Green No. 3, FD&C Red No. 40, FD&C Red No. 3, FD&C Yellow No. 5, FD&C Yellow No. 6, a metal oxide pigment, a natural pigment, and a combination thereof. In some embodiments, the colorant is present in the thermotropic adhesive sealing composition at about 0.01 wt. % to about 0.1 wt. %.

In some embodiments, the plasticizer that is linked to the thermotropic adhesive sealing composition is selected from a caproate plasticizer, a sebacate, a adipate, a glutarate, a trimellitate, a maleate, a benzoate, an epoxidized vegetable oil, a polyglycol, a polyether, an acylated monoglyceride, an acylated diglyceride, an acylated triglyceride, an alkyl citrate, a 1,2-cyclohexane dicarboxylic acid diisononyl ester, a natural rubber, a natural plasticizer and a combination thereof. In some embodiments, an epoxidized vegetable oil is a vegetable oil that has been manufactured via a process of epoxidation. In some embodiments, the vegetable oil can be soybean oil. In some embodiments, the plasticizer is present in the thermotropic adhesive sealing composition at about 2 wt. % to about 10 wt. %.

In some embodiments, the first liquid crystal polymer comprises: at least one plurality of first liquid crystal thermotropic structures and at least one plurality of second liquid crystal thermotropic structures; wherein the at least one plurality of first liquid crystal thermotropic structures is covalently bound to the at least one plurality of second liquid crystal thermotropic structures.

In some embodiments, the at least one plurality of first liquid crystal thermotropic structures of the first liquid crystal polymer comprise reaction products from at least one polymerizable monomeric species. In some embodiments, the monomeric species comprise styrene, acrylate, methylacrylate, methylmethacrylate, acrylamide, butadiene, alpha olefins, olefins, polyester monomers, polyalkylene comonomers, siloxane monomers, polyamide monomers, polyether monomers, or a combination thereof.

In some embodiments, the at least one plurality of first liquid crystal thermotropic structures of the first liquid crystal polymer comprise polystyrene, polyacrylates, polybutadiene, polyoliphenes, polymethylacrylates, polyacrylamides, polyethers, polysulphones, polycarbonates, polyamides, or a combination thereof.

In some embodiments, the at least one plurality of first liquid crystal thermotropic structures of the first liquid crystal polymer comprise copolymers of: polystyrene, polyacrylates, polybutadiene, polyoliphenes, polymethylacrylates, polyacrylamides, polyethers, polysulphones, polycarbonates, polyamides, or a combination thereof.

In some embodiments, the at least one plurality of first liquid crystal thermotropic structures of the first liquid crystal polymer comprise polyblends of polystyrene, polyacrylates, polybutadiene, polyoliphenes, polymethylacrylates, polyacrylamides, polyethers, polysulphones, polycarbonates, polyamides, or combinations thereof.

In some embodiments, the at least one plurality of first liquid crystal thermotropic structures of the first liquid crystal polymer comprise interpenetrating polymer networks of polystyrene, polyacrylates, polybutadiene, polyoliphenes, polymethylacrylates, polyacrylamides, polyethers, polysulphones, polycarbonates, polyamides, or combinations thereof.

In some embodiments, the at least one plurality of second liquid crystal thermotropic structures of the first liquid crystal polymer comprise reaction products of substituted acrylate monomers, substituted acrylamide monomers or a combination thereof.

In some embodiments, the first liquid crystal polymer comprises commercial silicone, VECTRA® LCP, natural rubber, isobutyl rubber, ply(4-hydroxy benzoic acid)liquid crystal amides, pentaerythritol derived liquid crystals, cholesterol derived liquid crystals, or a combination thereof.

In some embodiments, the liquid crystal amides of the first liquid crystal polymer comprise N-(m-alkoxyphenyl) amide, N-alkyl amide or a combination thereof.

In some embodiments, the cholesterol derived liquid crystals of the first liquid crystal polymer comprise a cholesterol molecule covalently linked via a spacer to a mesogenic core. In some embodiments, the spacer comprises an oxyalkanoyloxy, oxyalkoxy, alkanedioic, oxyalkoxycarbonyloxy, diynedioic or a combination thereof. In some embodiments, the mesogenic core comprises a tolane, a chalcone, a bent core system, a cyclohexane, an ester, a salicylaldimine, a stilbene, a diphenylbutadiene, a terphenyl, a sydnone, a supramolecular system or a combination thereof.

In some embodiments, the cholesterol derived liquid crystals of the first liquid crystal polymer comprises cholesteryl benzoate.

In some embodiments, the pentaerythritol-derived liquid crystals of the first liquid crystal polymer comprise a functionalized pentaerythritol core structure of formula II:

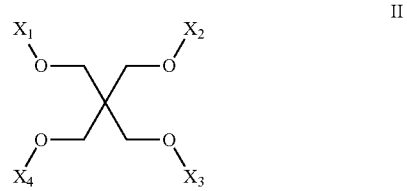

wherein $X_{1-4}$ are independently selected from $(CH_2)_n$—R, $C(O)$—$(CH_2)_m$—R and a combination thereof, wherein R is a mesogenic subunit, and wherein n and m are independently an integer from 1 to 20. In some embodiments, n is independently selected from 1, 2, 3, 4, 5, 6, 7, 8, 9, 10, 11, 12, 13, 14, 15, 16, 17, 18, 19, and 20. In some embodiments, m is selected from 1, 2, 3, 4, 5, 6, 7, 8, 9, 10, 11, 12, 13, 14, 15, 16, 17, 18, 19, and 20.

In some embodiments, the mesogenic subunits are independently selected from:

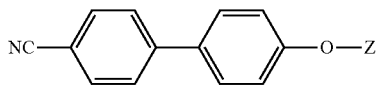

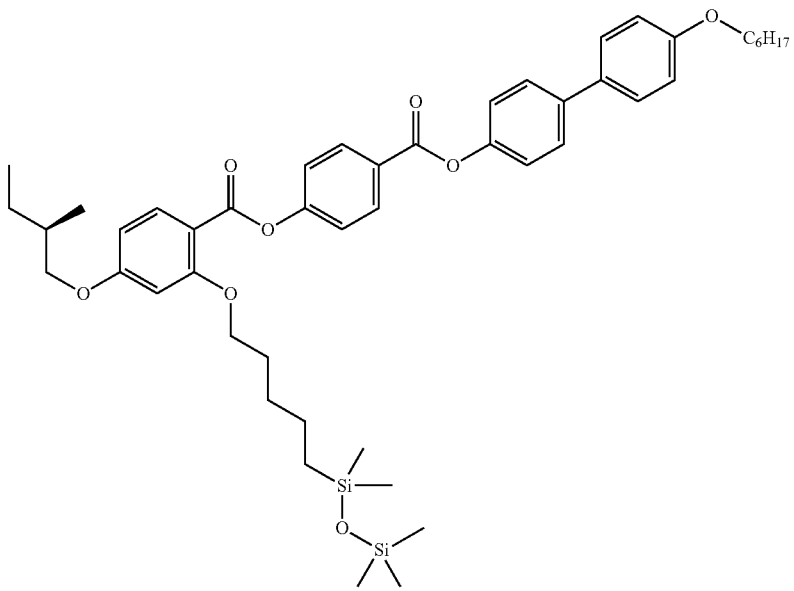

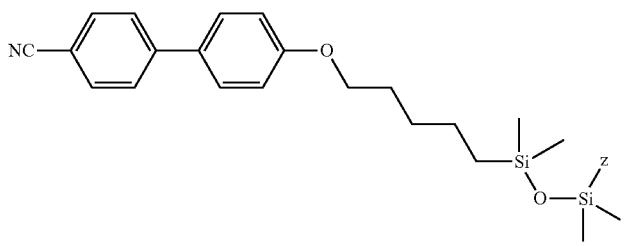

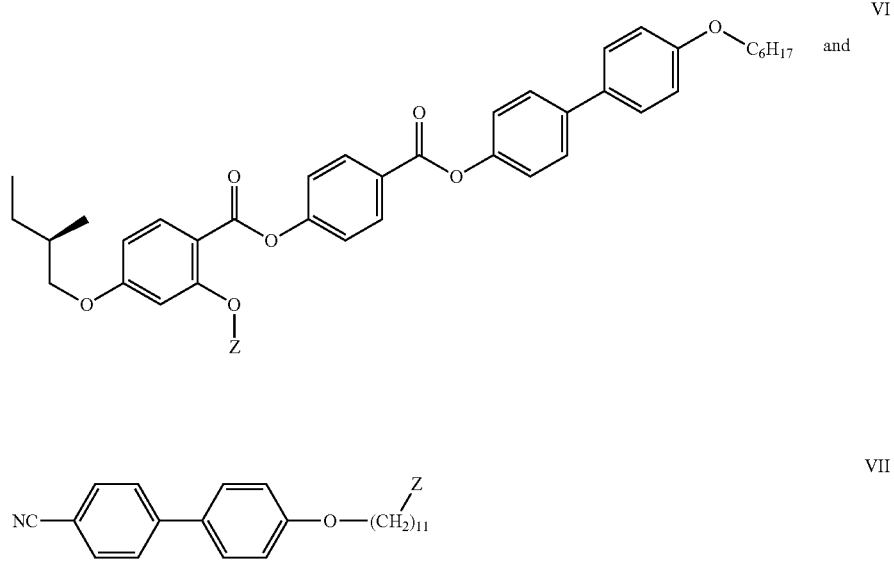

wherein Z represents the pentaerythritol core structure.

Some embodiments further comprise a status indicator, wherein the status indicator provides a status selected from sealed, un-sealed, expired, thawed, frozen, temperature, contamination, freshness, pH and a combination thereof, and wherein the status indicator is linked via covalent bonding, hydrogen bonding or a combination thereof to the first liquid crystal polymer.

In some embodiments, the status indicator that is linked to the first liquid crystal polymer comprises a dye, an antiseptic pigment, an oxygen responsive dye, an oxidizable functional group or a combination thereof. In some embodiments, oxidation of the oxidizable functional groups changes a color of the thermotropic adhesive sealing composition.

In some embodiments, the status indicator that is linked to the first liquid crystal polymer is selected from phenol red, methylene blue, a hydroquinone antioxidant, phenolphthalein, antioxidants derived from humic acid, antioxidants derived from fulvic acid, plant derived pigments and a combination thereof.

In some embodiments, the thermotropic adhesive sealing composition further comprises a second liquid crystal polymer. In some embodiments, the second liquid crystal polymer comprises commercial silicone, VECTRA® LCP, natural rubber, isobutyl rubber, ply(4-hydroxy benzoic acid, liquid crystal amides, pentaerythritol derived liquid crystals, cholesterol derived liquid crystals, a supramolecular motif or a combination thereof.

In some embodiments, the second liquid crystal polymer is bound to the first liquid crystal polymer via covalent bonding, hydrogen bonding, Van der Waals forces or a combination thereof. In some embodiments, the second liquid crystal polymer is non-covalently bound to the first liquid crystal polymer to form a supramolecular structure.

In some embodiments, the first liquid crystal polymer and the second liquid crystal polymer form an interpenetrating polymer network. In some embodiments, the first liquid crystal polymer and the second liquid crystal polymer form a semi-interpenetrating polymer network. In some embodiments, the first liquid crystal polymer and the second liquid crystal polymer form an interpenetrating polymer network by forming covalent bonds between the first liquid crystal polymer and the second liquid crystal polymer, between a first liquid crystal polymer and another first liquid crystal polymer, between the second liquid crystal polymer and another second liquid crystal polymer and combinations thereof. In some embodiments, the first liquid crystal polymer and the second liquid crystal polymer form an interpenetrating polymer network by forming non-covalent interactions (i.e. hydrogen bonding and Van der Waals interactions) between the first liquid crystal polymer and the second liquid crystal polymer, between a first liquid crystal polymer and another first liquid crystal polymer, between the second liquid crystal polymer and another second liquid crystal polymer and combinations thereof.

In some embodiments, the first liquid crystal polymer and the second liquid crystal polymer form a polymer blend. In some embodiments, the first liquid crystal polymer and the second liquid crystal polymer form a graft copolymer. In some embodiments, the first liquid crystal polymer and the second liquid crystal polymer form a block copolymer. In some embodiments, the first liquid crystal polymer and the second liquid crystal polymer form an AB graft copolymer.

In some embodiments, the liquid crystal amides of the second liquid crystal polymer comprise N-(m-alkoxyphenyl) amide, N-alkyl amide or a combination thereof.

In some embodiments, the cholesterol derived liquid crystals of the second liquid crystal polymer comprise a cholesterol molecule covalently linked via a spacer to a mesogenic core. In some embodiments, the spacer comprises an oxyalkanoyloxy, oxyalkoxy, alkanedioic, oxyalkoxycarbonyloxy, diynedioic or a combination thereof. In some embodiments, the mesogenic core comprises, a tolane, a chalcone, a bent core system, a cyclohexane, an ester, a salicylaldimine, a stilbene, a diphenylbutadiene, a terphenyl, a sydnone, a supramolecular system, a liquid crystal polymer or a combination thereof. In some embodiments, the cholesterol derived liquid crystals comprises cholesteryl benzoate.

In some embodiments, the pentaerythritol derived liquid crystals of the second liquid crystal polymer comprise a functionalized pentaerythritol core structure of formula II:

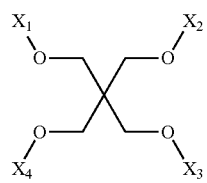

wherein X$_{1-4}$ are independently selected from (CH$_2$)$_n$—R, C(O)—(CH$_2$)$_m$—R and a combination thereof, wherein R is a mesogenic subunit, and wherein n and m are independently an integer from 1 to 20. In some embodiments, n is independently selected from 1, 2, 3, 4, 5, 6, 7, 8, 9, 10, 11, 12, 13, 14, 15, 16, 17, 18, 19, and 20. In some embodiments, m is selected from 1, 2, 3, 4, 5, 6, 7, 8, 9, 10, 11, 12, 13, 14, 15, 16, 17, 18, 19, and 20. In some embodiments at least one of X$_{1-4}$ is the at least one plurality of first liquid crystal thermotropic structures, the at least one plurality of second liquid crystal thermotropic structures or a combination thereof.

In some embodiments, the mesogenic subunits are independently selected from:

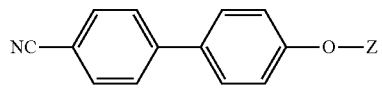

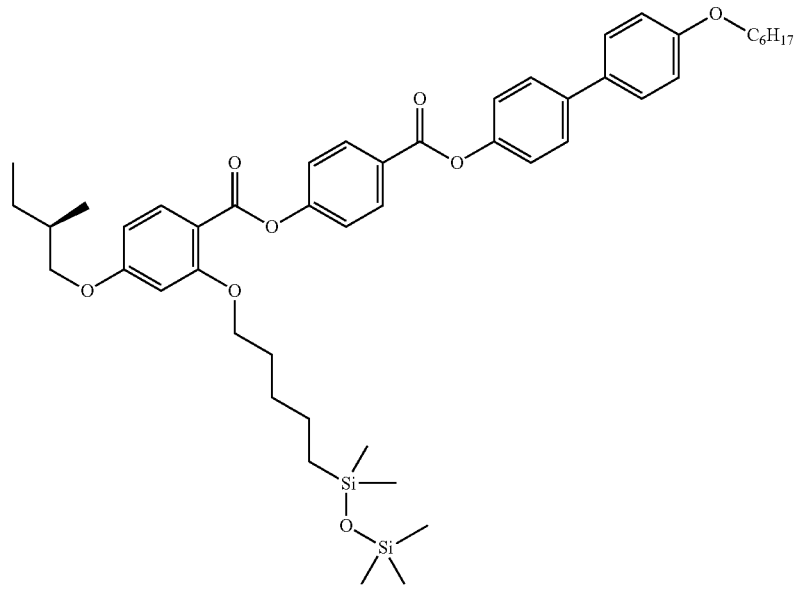

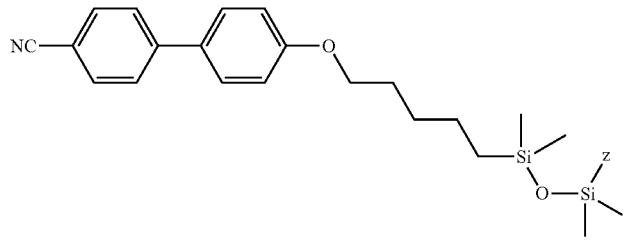

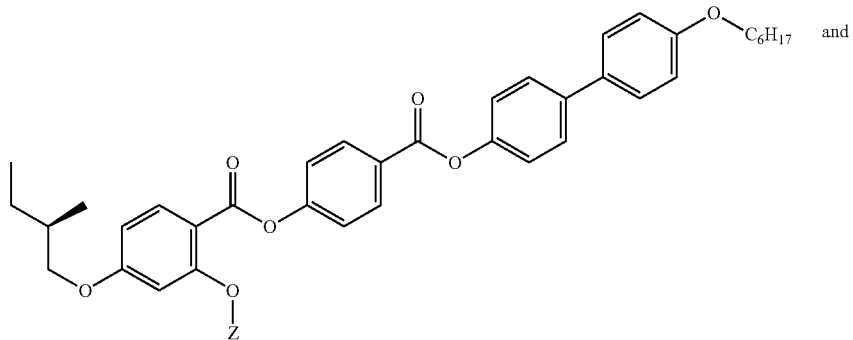

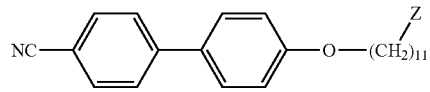

VII wherein Z represents the pentaerythritol core structure.

Some embodiments further comprise a status indicator, wherein the status indicator can provide a status selected from sealed, un-sealed, expired, thawed, frozen, temperature, contamination, freshness, pH, or a combination thereof and wherein the status indicator is linked via covalent bonding, hydrogen bonding, Van der Waals forces or a combination thereof, to the second liquid crystal polymer.

In some embodiments, the status indicator that is linked to the second liquid crystal polymer comprises a dye, an antiseptic pigment, an oxygen responsive dye, an oxidizable functional group or a combination thereof.

In some embodiments, the status indicator that is linked to the second liquid crystal polymer is selected from phenol red, methylene blue, a hydroquinone antioxidant, phenolphthalein, antioxidants derived from humic acid, antioxidants derived from fulvic acid, plant derived pigments or a combination thereof. In some embodiments, oxidation of the oxidizable functional groups changes a color of the thermotropic adhesive sealing composition.

In some embodiments, the second liquid crystal polymer comprise at least one plurality of first liquid crystal polymer structures and at least one plurality of second liquid crystal polymer structures. In some embodiments, the second liquid crystal polymer comprise at least one plurality of first liquid crystal polymer structures and at least one plurality of second liquid crystal polymer structures wherein the at least one plurality of first liquid crystal polymer structures and the at least one plurality of second liquid crystal polymer structures are covalently bound.

In some embodiments, the at least one plurality of first liquid crystal structures of the second liquid crystal polymer comprises reaction products of at least one polymerizable monomeric species. In some embodiments, the monomeric species comprise styrene, acrylate, methylacrylate, methylmethacrylate, acrylamide, butadiene, alpha olefins, olefins, polyester monomers, polyalkylene comonomers, siloxane monomers, polyamide monomers, polyether monomers, or a combination thereof.

In some embodiments, the at least one plurality of first liquid crystal thermotropic structures of the second liquid crystal polymer comprise: polystyrene, polyacrylates, polybutadiene, polyoliphenes, polymethylacrylates, polyacrylamides, polyethers, polysulphones, polycarbonates, polyamides, or a combination thereof.

In some embodiments, the at least one plurality of first liquid crystal thermotropic structures of the second liquid crystal polymer comprise copolymers of: polystyrene, polyacrylates, polybutadiene, polyoliphenes, polymethylacrylates, polyacrylamides, polyethers, polysulphones, polycarbonates, polyamides, or a combination thereof.

In some embodiments, the at least one plurality of first liquid crystal thermotropic structures of the second liquid crystal polymer comprise polyblends of polystyrene, polyacrylates, polybutadiene, polyoliphenes, polymethylacrylates, polyacrylamides, polyethers, polysulphones, polycarbonates, polyamides, or combinations thereof.

In some embodiments, the at least one plurality of first liquid crystal thermotropic structures of the second liquid crystal polymer comprise interpenetrating polymer networks of polystyrene, polyacrylates, polybutadiene, polyoliphenes, polymethylacrylates, polyacrylamides, polyethers, polysulphones, polycarbonates, polyamides, or combinations thereof.

In some embodiments, the at least one plurality of second liquid crystal thermotropic structures of the second liquid crystal polymer comprise reaction products of substituted acrylate monomers, substituted acrylamide monomers or a combination thereof.

Some embodiments further comprise a status indicator, wherein the status indicator provides a status selected from sealed, un-sealed, expired, thawed, frozen, temperature, contamination, freshness, pH, or a combination thereof. In some embodiments, the status indicator is linked via covalent bonding, hydrogen bonding, Van der Waals forces, or a combination thereof, to the first liquid crystal polymer, the second liquid crystal polymer or a combination thereof.

In some embodiments, the status indicator that is linked to the first liquid crystal polymer, the second liquid crystal polymer or a combination thereof, comprises a dye, an antiseptic pigment, an oxygen responsive dye, an oxidizable functional group or a combination thereof.

In some embodiments, the status indicator that is linked to the first liquid crystal polymer, the second liquid crystal polymer or a combination thereof, is selected from phenol red, methylene blue, a hydroquinone antioxidant, phenolphthalein, an antioxidant derived from humic acid, an antioxidant derived from fulvic acid, a plant derived dye, ascorbic acid, gallic acid, tannin, and a combination thereof. In some embodiments, oxidation of the oxidizable functional groups changes a color of the thermotropic adhesive sealing composition.

In some embodiments, the container portion and the lid portion are connected. In some embodiments, the container portion and the lid portion are tethered together. In some embodiments, the container portion and the lid portion form a single piece making up the container. In some embodiments, the container portion and the lid portion form a single piece and the lid portion is defined by a mating interface of two or more parts of the container portion. In some embodiments, the container portion and the lid portion comprise the same material. In some embodiments, the container portion and the lid portion comprise different materials.

In some embodiments, an existing container comprises thermotropic adhesive seals described in herein. In some embodiments, the thermotropic adhesive seals disclosed herein can be made to conform to any shape or size of container. In some embodiments, the thermotropic adhesive seals described herein can be used with containers made from a variety of materials such, but not limited to, plastic, metal, glass, ceramic, stone, paper, fabric, wood, or combinations thereof. In some embodiments, the thermotropic adhesive seals disclosed herein can be used on containers that are for example, but not limited to flexible or rigid.

Some embodiments are directed to a method of preparing a resealable container, the method comprising: combining a lid with a container to form a closed container wherein the container, the lid or a combination thereof comprises a thermotropic adhesive sealing composition positioned at an interface of the container and the lid; changing a temperature of the container to form a sealed container, wherein the seal is formed by the thermotropic adhesive sealing composition positioned at the interface of the container and the lid.

In some embodiments, the thermotropic adhesive sealing composition in the above method comprises a liquid crystal polymer.

In some embodiments, changing the temperature of the container comprises raising or lowering the temperature of the container until a phase transition temperature of the thermotropic adhesive sealing composition is reached. In some embodiments, changing the temperature of the container can be effected by heating or cooling the container, or heating produced by friction. In some embodiments, the phase transition temperature of the thermotropic adhesive sealing composition is chosen based on the use of the container. In some embodiments, the phase transition temperature of the thermotropic adhesive sealing composition is chosen so that the container is sealed under normal storage conditions of contents in the container.

In some embodiments, the seal between the lid and the container is formed when the phase transition temperature of the thermotropic adhesive sealing composition is reached. In some embodiments, upon reaching the phase transition temperature of the thermotropic adhesive sealing composition, a network of hydrogen bonds is formed. In some embodiments, the network of hydrogen bonds comprises intermolecular hydrogen bonds, intramolecular hydrogen bonds or combinations thereof.

Some embodiments further comprise filling the container with a product. In some embodiments, the product is a food product or beverage. In some embodiments, the food product or beverage is perishable. In some embodiments, the product is a medication, vaccine, electronic material or other products that are sensitive to environmental conditions such as but not limited to moisture or light.

Some embodiments are directed to a method of containing an article, the method comprising: placing the article into a resealable container; placing a lid onto the resealable container, wherein a thermotropic adhesive sealing composition is positioned at an interface of the lid and the container forming a seal; and forming a sealed container.

In some embodiments, forming a seal comprises creating a barrier between an interior portion of the container and an exterior of the container. In some embodiments, the barrier makes the interior portion of the container impermeable to gases, liquids, solids or a combination thereof, located on the exterior of the container. In some embodiments, forming a sealed container comprises lowering a temperature of the container to below a phase transition temperature of the thermotropic adhesive sealing composition. Some embodiments further comprise unsealing the container. In some embodiments, forming a sealed container and unsealing the container can be sequentially repeated at least once. In some embodiments, unsealing the container comprises raising the temperature of the container to above the phase transition temperature of thermotropic adhesive sealing composition. In some embodiments, the article is a food or beverage. In some embodiments, the product is a medication, vaccine, electronic material or other products that are sensitive to environmental conditions such as but not limited to moisture or light.

EXAMPLES

Example 1

A Thermotropic Adhesive

A thermotropic adhesive consisting of a polymethylacrylate backbone of the formula:

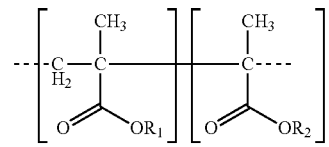

wherein $R_1$ is:

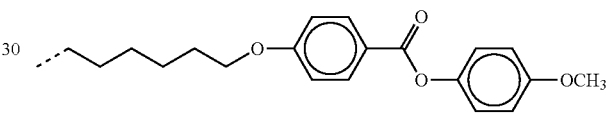

and
wherein $R_2$ is:

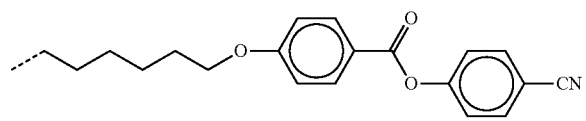

The thermotropic adhesive has a phase transition temperature of 37° C. The thermotropic adhesive also includes a phenolphthalein dye that is non-covalently linked to the thermotropic adhesive.

Example 2

A Thermotropic Adhesive

A thermotropic adhesive consisting of the formula:

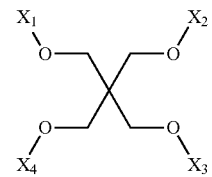

where $X_1$-$X_3$ is $(CH_2)_n$—R wherein n=5 and wherein R is:

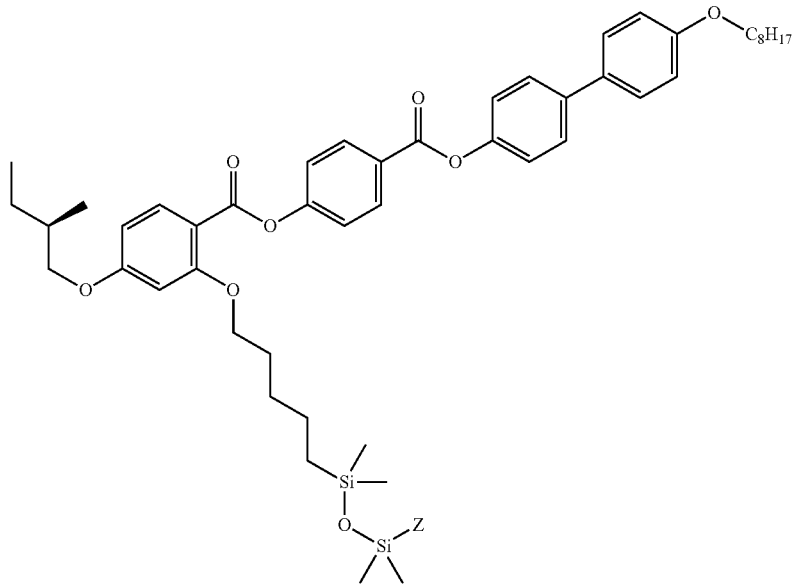

where Z represents the attachment point to the pentaerythritol backbone; and where $X_4$ is $C(O)$—$(CH_2)_m$—R wherein m=4 and R is:

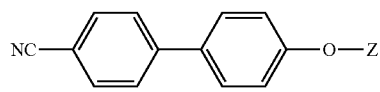

The thermotropic adhesive has a phase transition temperature of 58.8° C.

Example 3

A Thermotropic Adhesive Sealing Composition

A thermotropic adhesive sealing composition consisting of the thermotropic adhesive of Example 1, a caproate plasticizer making up about 5 wt. % of the thermotropic adhesive sealing composition and an antioxidant derived from fulvic acid making up about 0.1 wt. % of the thermotropic adhesive sealing composition.

Example 4

A Thermotropic Adhesive Sealing Composition

A thermotropic adhesive sealing composition consisting of the thermotropic adhesive of Example 1, the thermotropic adhesive of Example 2, a caproate plasticizer making up about 5 wt. % of the thermotropic adhesive sealing composition and a an antioxidant derived from fulvic acid making up about 0.1 wt. % of the thermotropic adhesive sealing composition.

The thermotropic adhesive of Example 1 and the thermotropic adhesive of example 2 combine to form the thermotropic adhesive sealing composition by hydrogen bonding and Van De Waals interactions. The phase transition temperature of the thermotropic adhesive sealing composition is between −20° C. and 60° C.

Example 5

A Resealable Container

A resealable container consisting of a lid portion, a container portion and the thermotropic adhesive sealing composition of Examples 3 or 4 wherein the thermotropic adhesive sealing composition is permanently attached to the lid portion of the resealable container. The thermotropic adhesive sealing composition is disposed between the lid portion and the container portion of the resealable container so as to form a seal.

When the phase transition temperature of the thermotropic adhesive sealing composition is reached or exceeded, the seal is broken and the lid portion and the container portion can be separated. When the temperature falls below the phase transition temperature of the thermotropic adhesive seal, a seal is formed between the lid portion and the container portion of the resealable container.

The seal formed between the lid portion and container portion results in protection of the contents of the resealable container from exterior conditions such as for example moisture and microorganisms.

Example 6

Using a Resealable Container for the Storage of Peanut Butter

The resealable container of Example 5 can be used to store peanut butter. The resealable container is opened by heating the container above the phase transition temperature of the thermotropic adhesive sealing composition. This results in a disruption of the sealing properties of the thermotropic adhesive sealing composition and allows the user to open the resealable container and access its content.

The resealable container can be re-sealed by placing the lid portion in contact with the container portion and lowering the temperature of the container to below the phase transition temperature of the thermotropic adhesive sealing composition resulting in the formation of a seal.

Example 7

Use of a Resealable Container for the Storage of Soymilk

The thermotropic adhesives of Example 1 can be used to form a resealable container for the storage of a soymilk which requires refrigeration. The thermotropic adhesive is configured to function with conventional packaging containers commonly used in the food packaging industry. The thermotropic adhesive is placed at the interface of a lid portion of the container with a container portion of the container. For example, the thermotropic adhesive can be placed on the interface of the screw-on lid of a traditional glass or plastic jar or at the interface of two or more parts of a container that form an opening or closure (e.g. a paper milk carton or a storage bag). When the container is closed and placed in a refrigerator, the ambient temperature around the container will be below the phase transition temperature of the thermotropic adhesive, causing the adhesive to form a seal that will be maintained until the container is removed from the refrigerator and heated to its transition temperature of 37° C. after which the seal will be broken and the container can be opened. The container can be heated to its transition temperature by the user by, for example, by holding the container in the user's hands to raise the temperature. The container can then be re-sealed by repeating the above process.

Example 8

Use of a Thermotropic Adhesive for the Storage of a Frozen Food Product

The thermotropic adhesives of Example 2 can be used to form a resealable container for the storage of frozen broccoli. The thermotropic adhesive is configured to function with conventional packaging containers commonly used in the food packaging industry. The thermotropic adhesive is placed at the interface of a lid portion of the container with a container portion of the container. For example, the thermotropic adhesive can be placed at the interface of two or more parts of a container that form an opening (e.g. a storage bag). When the container is closed and placed in a freezer, the ambient temperature around the container will be below the phase transition temperature of the thermotropic adhesive, causing the adhesive to form a seal that will be maintained until the container is removed from the freezer and heated to its transition temperature of 58.8° C., such as by placing the container in a microwave and running the microwave on a defrost function, after which the seal will be broken and the container can be opened.

Example 9

Use of a Thermotropic Adhesive for the Preparation of Food

The thermotropic adhesives of Examples 1 or 2 or the thermotropic adhesive compositions of Examples 3 or 4 can be implemented into containers that are used for the preparation of food. The thermotropic adhesives and thermotropic adhesive compositions of Examples 1, 2, 3, or 4 will form a seal below their phase transition temperature when they are configured at the interface of a lid portion of the container with a container portion of the container. For example, the thermotropic adhesive can be placed on the inner lip of the screw-on lid of a traditional glass or plastic jar or at the interface of two or more parts of a container that form an opening (e.g. a storage bag). The thermotropic adhesive seal or thermotropic adhesive composition can function as a gasket during the cooking or preparation of food wherein, the seal is broken when the phase transition temperature of the thermotropic adhesive seal or thermotropic adhesive seal composition is reached. This feature may be useful in conditions where heating or preparing the food product in the container may result in an increase in pressure due to the production of steam. The thermotropic nature of the seals and compositions allows to them to be responsive to temperature changes and therefore useful in creating packages that respond to changing temperatures during food preparation.

Example 10

A Thermotropic Adhesive Sealing Composition with a Freshness Indicator

The composition is made up of a thermotropic adhesive consisting of a polymethylacrylate backbone of the formula:

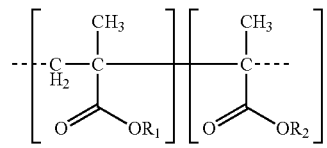

wherein $R_1$ is:

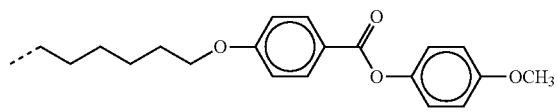

and
wherein $R_2$ is:

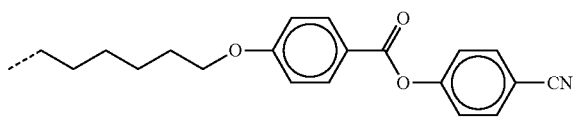

The thermotropic adhesive has a phase transition temperature of 37° C. The thermotropic adhesive composition also includes phenol red, (a pH sensitive dye that is non-covalently linked to the thermotropic adhesive), a caproate plasticizer making up about 5 wt. % of the thermotropic adhesive sealing composition and an antioxidant derived from fulvic acid making up about 0.1 wt. % of the thermotropic adhesive sealing composition.

Example 11

Use of a Thermotropic Adhesive Sealing Composition with a Freshness Indicator for the Storage of Fresh Fish The thermotropic adhesive sealing composition of Example 10 can be used in the packaging of fresh fish. The thermotropic adhesive sealing composition is disposed at the interface of a polystyrene container with a plastic lid portion such that the thermotropic adhesive sealing composition holds the plastic lid portion in contact with the polystyrene container and forms a seal. The presence of the phenol red allows for monitoring of the pH of the inside of the packaging. As the freshness of the fish declines, the pH of the inside of the container will increase. This increase in pH is captured by a change in the color of the phenol red in the thermotropic adhesive sealing composition from yellow to red as the pH becomes more alkaline. The consumer is able to determine if the fish is still fresh by observing the color of the thermotropic adhesive sealing composition without needing to open the container.

Example 12

A Tamper Evident Thermotropic Adhesive Sealing Composition

The composition is made up of a thermotropic adhesive consisting of the formula:

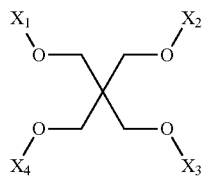

where $X_1$-$X_3$ is $(CH_2)_n$—R wherein n=5 and wherein R is:

where Z represents the attachment point to the pentaerythritol backbone; and where $X_4$ is $C(O)$—$(CH_2)_m$—R wherein m=4 and R is:

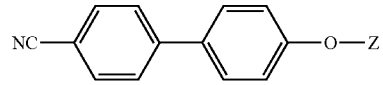

The thermotropic adhesive has a phase transition temperature of 58.8° C.

The thermotropic adhesive composition also includes methylene blue, (an oxygen sensitive dye that is non-covalently linked to the thermotropic adhesive), a caproate plasticizer making up about 5 wt. % of the thermotropic adhesive sealing composition, and a an antioxidant derived from fulvic acid making up about 0.1 wt. % of the thermotropic adhesive sealing composition.

Example 13

Use of a Tamper Evident Thermotropic Adhesive Sealing Composition for the Storage of Multivitamins The thermotropic adhesive sealing composition of Example 12 can be used in the packaging of multivitamins. The thermotropic adhesive sealing composition is disposed at the interface of a vitamin container with a lid portion such that the thermotropic adhesive sealing composition holds the lid portion in contact with the container and forms a seal and protects the multivitamin from excessive exposure to air and moisture. The presence of the methylene blue allows for monitoring of the integrity of the seal of the vitamin container. When the container is opened for the first time or tampered with, the color of the thermotropic adhesive sealing composition will change permanently from clear to blue. It is therefore possible for the consumer to identify a

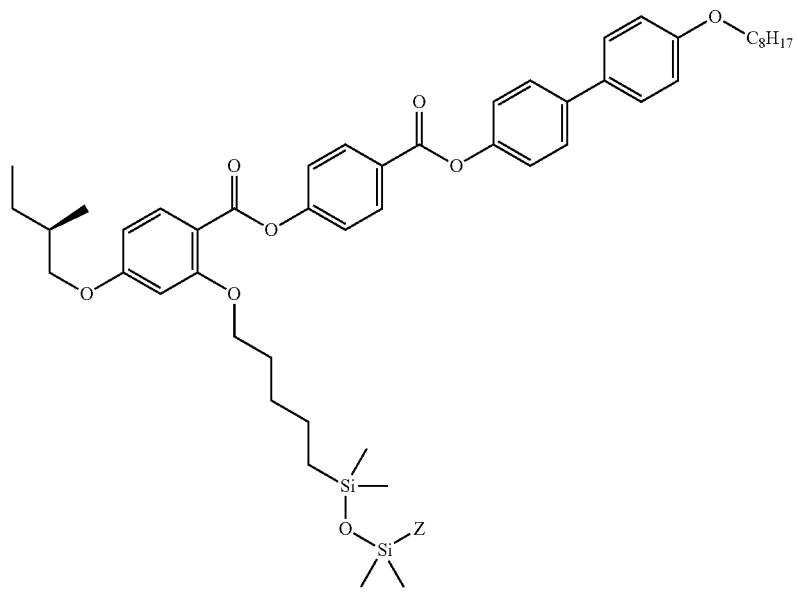

multivitamin container that has previously been opened and as a result is no longer sealed and not suitable for purchase or use.

Example 14

Use of a Tamper Evident Thermotropic Adhesive Sealing Composition for the Storage of a Cosmetic Cream The thermotropic adhesive sealing composition of Example 12 can be used in the packaging of cosmetic creams. The thermotropic adhesive sealing composition is disposed at the interface of a cosmetic cream container with a lid portion such that the thermotropic adhesive sealing composition holds the lid portion in contact with the container and forms a seal. The presence of the methylene blue allows for monitoring of the integrity of the seal of the container. When the container is opened for the first time or tampered with for any reason, the color of the thermotropic adhesive sealing composition will change permanently from clear to blue. It is therefore possible for the consumer to identify a cosmetic cream package that has previously been opened and as a result is no longer sealed and suitable for purchase or use.

Example 15

A Thermotropic Adhesive Sealing Composition for the Storage of Oxygen Sensitive Drugs The composition is made up of a thermotropic adhesive consisting of a polymethylacrylate backbone of the formula:

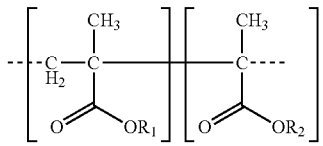

wherein $R_1$ is:

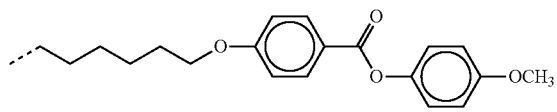

and
wherein $R_2$ is:

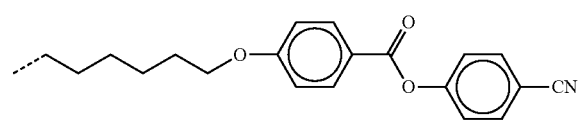

The thermotropic adhesive has a phase transition temperature of 37° C. The thermotropic adhesive composition also includes methylene blue, (an oxygen sensitive dye that is non-covalently linked to the thermotropic adhesive), a caproate plasticizer making up about 5 wt. % of the thermotropic adhesive sealing composition, and a an antioxidant derived from fulvic acid making up about 0.1 wt. % of the thermotropic adhesive sealing composition.

Example 16

Use of a Tamper Evident Thermotropic Adhesive Sealing Composition for the Storage of an Oxygen Sensitive Drug Statins are a class of oral drugs used to lower cholesterol levels. The statins are typically formulated as pills that are stored in traditional pill bottles. These drugs are also known to be sensitive to oxygen and excessive exposure to oxygen can result in a loss of the effectiveness of the drug. The thermotropic adhesive sealing composition of Example 15 can be used to ensure a seal on the pill bottles when these are closed such that there is a minimum exposure to air when the pill bottle is closed. Heat from the patient's hand will cause the seal to be broken and allow the pill bottle to be opened, allowing the patient to dispense the required number of pills and then upon closing the pill bottle a seal will be once again formed to prevent excess exposure to air. The presence of the methylene blue in the thermotropic adhesive sealing composition will allow the patient to determine if the pill bottle has previously been tampered with or opened. When the pill bottle is opened for the first time or tampered with for any reason, the color of the thermotropic adhesive sealing composition will change permanently from colorless to blue.

Example 17

A Thermotropic Adhesive Sealing Composition for Use in the Storage of the Oral Polio Vaccine as an Indicator of Heat Exposure The composition is made up of a thermotropic adhesive consisting of a polymethylacrylate backbone of the formula:

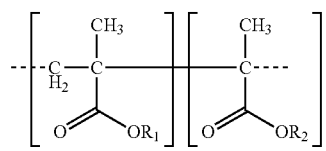

wherein $R_1$ is:

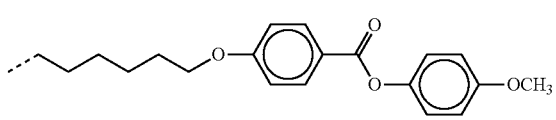

and
wherein $R_2$ is:

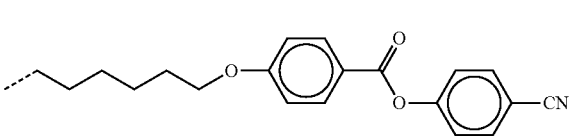

The thermotropic adhesive has a phase transition temperature of 37° C. The thermotropic adhesive composition also includes FD&C Blue No. 2, (a colorant that is non-covalently linked to the thermotropic adhesive), a caproate plasticizer making up about 5 wt. % of the thermotropic adhesive sealing composition, and an antioxidant derived from fulvic acid making up about 0.1 wt. % of the thermotropic adhesive sealing composition.

Example 18

Use of a Thermotropic Adhesive Sealing Composition in the Storage of the Oral Polio Vaccine The thermotropic adhesive sealing composition of Example 18 can be used to seal a container used to store the oral polio vaccine and also serve as an indicator of heat exposure that could affect the effectiveness of the vaccine. The thermotropic adhesive sealing composition can be used to seal a vaccine vial and when the vial is exposed to a high temperature exceeding 37° C., the thermotropic adhesive sealing composition changes phase and releases the FD&C Blue No. 2 colorant, which has been non-covalently bound to the thermotropic adhesive, into the vaccine. This will result in the vaccine color changing to indigo and will indicate to the medical professional that the vial of vaccine has been exposed to a temperature above 37° C. and should therefore not be administered to a patient.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

While various compositions, methods and devices are described in terms of "comprising" various components or steps (interpreted as meaning "including, but not limited to"), the compositions, methods, and devices can also "consist essentially of" or "consist of" the various components and steps, and such terminology should be interpreted as defining essentially closed-member groups.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a", "an", or "the" limits any particular claim containing such introduced claim recitation to embodiments containing only one such recitation, even when the same claim includes the introductory phrases "one or more" or "at least one" and indefinite articles such as "a", "an", or "the" (e.g., "a" and/or "an" and/or "the" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges that can be subsequently broken down into subranges as discussed above. Finally, as will be understood by one skilled in the art, a range includes each individual member. Thus, for example, a group having 1-3 substituents refers to groups having 1, 2, or 3 substituents. Similarly, a group having 1-5 substituents refers to groups having 1, 2, 3, 4, or 5 substituents, and so forth.

What is claimed is:

1. A resealable container comprising a container portion, a lid portion, and a thermotropic adhesive sealing composition, wherein the thermotropic adhesive sealing composition comprises a first liquid crystal polymer consisting of a polymethylacrylate backbone of the formula:

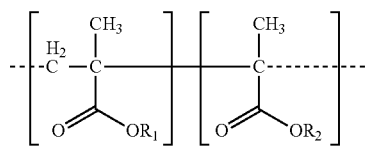

wherein $R_1$ is:

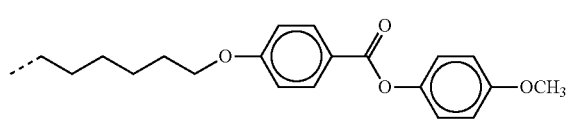

and
wherein $R_2$ is:

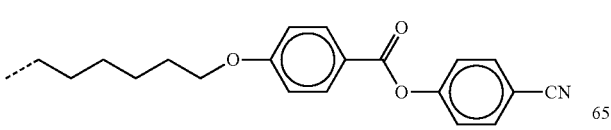

and a second liquid crystal polymer consisting of the formula

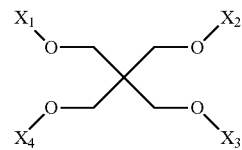

wherein $X_1$, $X_2$ and $X_3$ are each $(CH_2)_5$—R, wherein R is:

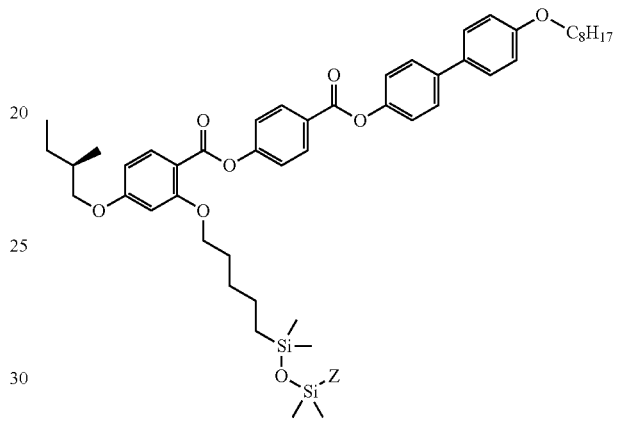

where Z represents the attachment point to the pentaerythritol backbone; and where $X_4$ is $C(O)$—$(CH_2)_4$—R and wherein R is:

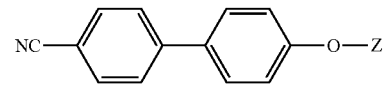

where Z represent the attachment to the pentaerythritol backbone.

2. The resealable container of claim 1, wherein the second liquid crystal polymer is bound to the first liquid crystal polymer via covalent bonding, hydrogen bonding, Van der Waals forces, or a combination thereof.

3. The resealable container of claim 1, wherein the second liquid crystal polymer is non-covalently bound to the first liquid crystal polymer to form a supramolecular structure.

4. The resealable container of claim 1, further comprising a status indicator, wherein the status indicator provides a status selected from sealed, un-sealed, expired, thawed, frozen, temperature, contamination, freshness, pH, and a combination thereof, and wherein the status indicator is linked via covalent bonding, hydrogen bonding, Van der Waals forces, or a combination thereof, to the second liquid crystal polymer.

5. The resealable container of claim 1,
wherein the resealable container further comprises a status indicator that provides a status selected from sealed, un-sealed, expired, thawed, frozen, temperature, contamination, freshness, pH, and a combination thereof, and wherein the status indicator is linked via covalent bonding, hydrogen bonding, Van der Waals forces, or a combination thereof to the first liquid crystal polymer.

6. The resealable container of claim 1, wherein the second liquid crystal polymer comprises a plurality of first liquid crystal thermotropic structures and a plurality of second liquid crystal thermotropic structures, wherein the plurality of first liquid crystal thermotropic structures and the plurality of second liquid crystal thermotropic structures are covalently bound.

7. The resealable container of claim 1, further comprising a status indicator, wherein the status indicator provides a status selected from sealed, un-sealed, expired, thawed, frozen, temperature, contamination, freshness, pH, and a combination thereof.

8. The resealable container of claim 7, wherein the status indicator comprises a dye, an antiseptic pigment, an oxygen responsive dye, an oxidizable functional group, or a combination thereof.

9. A method of containing an article, the method comprising:

placing the article into a resealable container comprising a container portion, a lid portion, and a thermotropic adhesive sealing composition, wherein the thermotropic adhesive sealing composition comprises a first liquid crystal polymer consisting of a polymethylacrylate backbone of the formula:

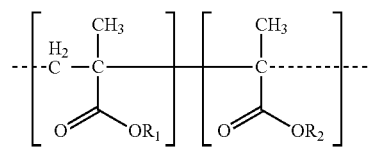

wherein $R_1$ is:

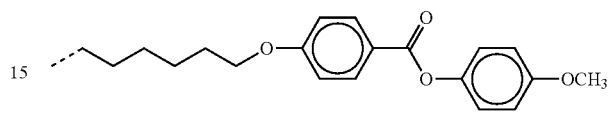

and
wherein $R_2$ is:

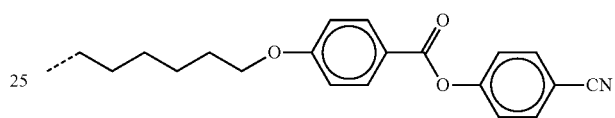

and a second liquid crystal polymer consisting of the formula

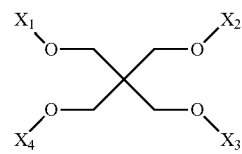

wherein $X_1$, $X_2$ and $X_3$ are each $(CH_2)_5$—R, wherein R is:

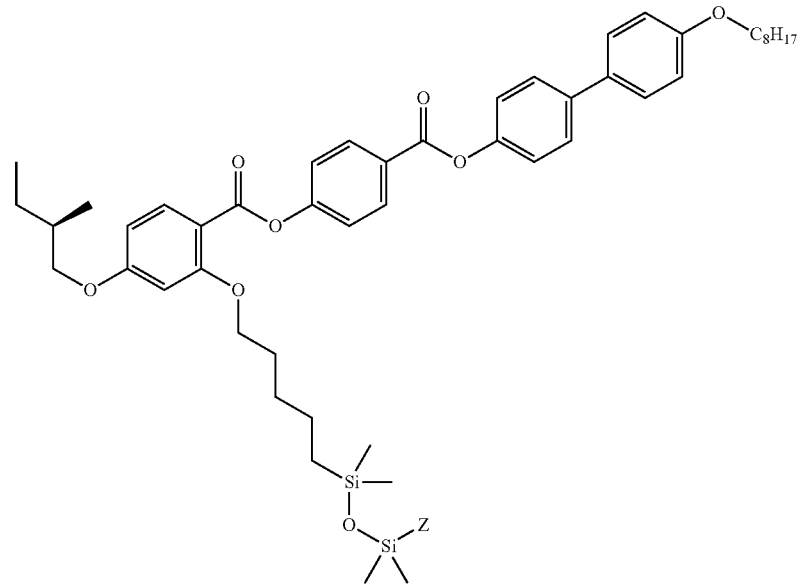

where Z represents the attachment point to the pentaerythritol backbone; and where $X_4$ is $C(O)$—$(CH_2)_4$—R and wherein R is:

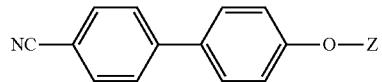

where Z represent the attachment to the pentaerythritol backbone;

placing a lid onto the resealable container, wherein the thermotropic adhesive sealing composition is positioned at an interface of the lid and the container, forming a seal; and unsealing the container, wherein unsealing the container comprises raising a temperature of the container to above a phase transition temperature of the thermotropic adhesive sealing composition.

* * * * *

UNITED STATES PATENT AND TRADEMARK OFFICE
CERTIFICATE OF CORRECTION

PATENT NO. : 9,493,275 B2  
APPLICATION NO. : 13/876016  
DATED : November 15, 2016  
INVENTOR(S) : Adam et al.

Page 1 of 1

It is certified that error appears in the above-identified patent and that said Letters Patent is hereby corrected as shown below:

In the Specification

In Column 1, Line 8, delete "§371" and insert -- § 371 --, therefor.

In Column 2, Line 18, delete "FIGURE," and insert -- Figure, --, therefor.

Signed and Sealed this
Eighteenth Day of April, 2017

Michelle K. Lee
*Director of the United States Patent and Trademark Office*